June 10, 1958   J. A. VAN HORN   2,838,693
ISOCHRONAL CONTROL DEVICE
Filed May 17, 1957   2 Sheets-Sheet 1

INVENTOR
JOHN A. VAN HORN

BY *M. W. Gould*
ATTORNEY

June 10, 1958        J. A. VAN HORN        2,838,693
ISOCHRONAL CONTROL DEVICE
Filed May 17, 1957        2 Sheets-Sheet 2
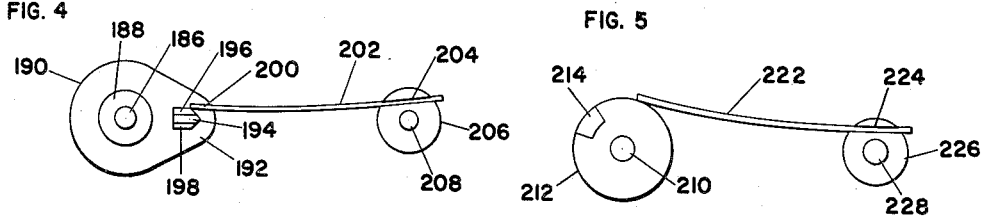
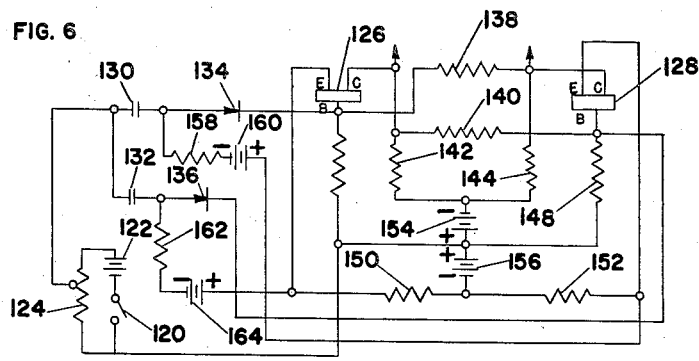
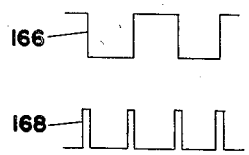
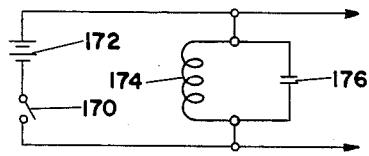
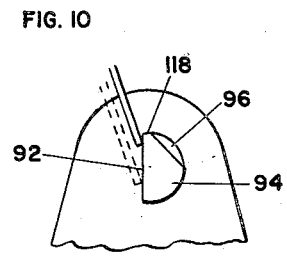
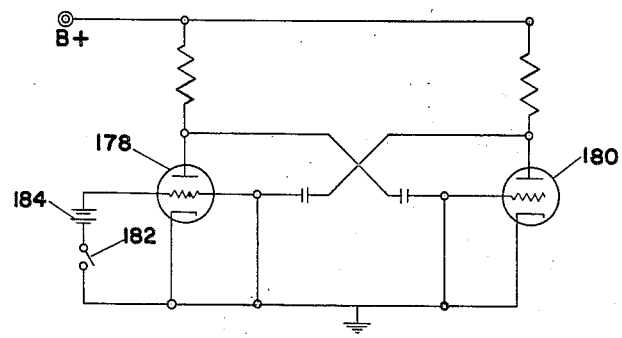
INVENTOR
JOHN A. VAN HORN
BY *M. W. Gould*
ATTORNEY

United States Patent Office 2,838,693
Patented June 10, 1958

2,838,693

ISOCHRONAL CONTROL DEVICE

John A. Van Horn, Lancaster, Pa., assignor to Hamilton Watch Company, Lancaster, Pa., a corporation of Pennsylvania Application May 17, 1957, Serial No. 660,003

20 Claims. (Cl. 307—132)

This invention relates to an isochronal device and more particularly relates to a completely portable electrically driven isochronal device which forms the controlling element of electric or electronic equipment.

Where isochronous or periodic electric or electronic power has been desired in the past it has been conventional to utilize electronic oscillators of various types or, where large amounts of power are desired, to use a generator and prime mover. The term isochronal power as used here contemplates alternating current signals or power of any wave shape, such as a sine wave, square wave, complex wave, various shaped pulses, etc. The electronic sources of such power which provide any reasonably stable frequency power have been of such a size, cost and complexity and have required such sources of electric power supply, that they have not lent themselves readily to miniaturization in completely portable low cost equipment.

According to the present invention it has now been found that it is possible to produce highly accurate isochronal power at any desired energy level by means of an extremely minute device which is completely portable and capable of operating over very extended periods of time. This device is self powered by means of an extremely tiny battery which sustains a staff in oscillatory motion at an accurate and fixed frequency. This staff carries contacts which control an electronic device which is itself the load for the system or which modifies the signal from the isochronal device to provide an output signal having the desired electrical characteristics. According to our invention the staff carries at one time the prime mover, the oscillatory isochronal arrangement, and the switching device and, according to one embodiment of the invention, the contacts essential to the operation of the prime mover are also utilized as the contacts of the signal generator.

It is accordingly a primary object of the present invention to provide a battery powered source of frequency stable isochronal power which may be provided in highly miniaturized form.

It is another object of the invention to provide a battery powered portable source of isochronal power wherein the isochronal element serves at the same time as a prime mover and switching element.

It is another object of the invention to provide a portable battery powered source of isochronal power utilizing a self-powered oscillatory member which itself produces an isochronal signal which may then be delivered at any desired energy level.

These and further objects and advantages of the invention will become more apparent upon reference to the following description and claims and appended drawings wherein:

Figure 4 is a partial plan view showing another contact arrangement for a prime mover which is pulsed in both directions of oscillation;

Figure 5 is a partial plan view showing a modification of a contact arrangement;

Figure 6 is a circuit diagram of a compact square wave generator utilizing transistors;

Figure 7 is an illustration of the wave forms obtained with the apparatus of Figure 6;

Figure 8 is a circuit diagram of a shock excited oscillator;

Figure 9 is a circuit diagram of a controlled multivibrator for providing an output signal which is a multiple or submultiple of the period of the isochronal element; and Figure 10 is a partial detail plan view of the roller table and pin shown in Figures 1 and 2.

Figure 1:
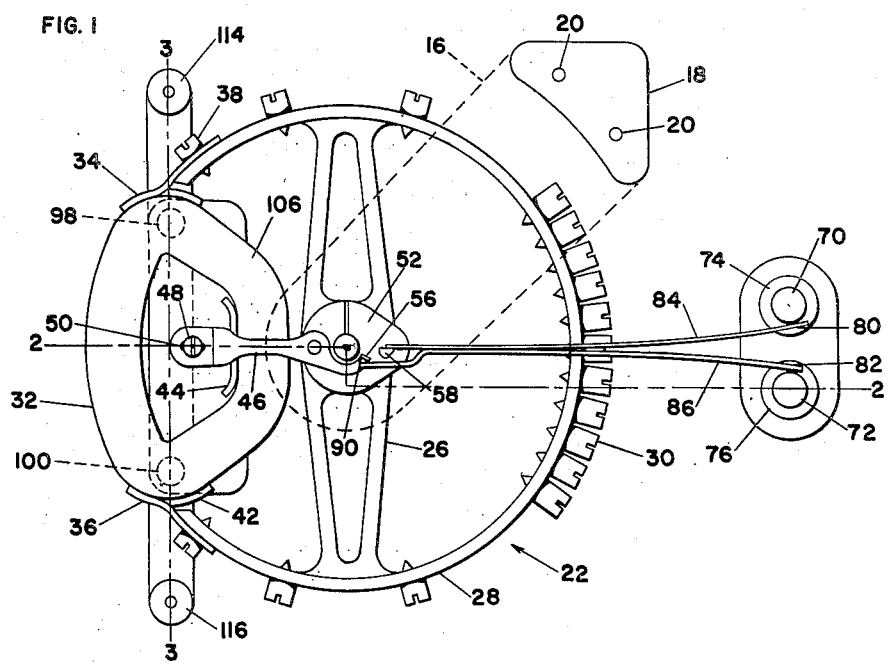
Figure 1 is a plan view of the combined prime mover and isochronal signal generator with the balance cock removed.
Figure 2:
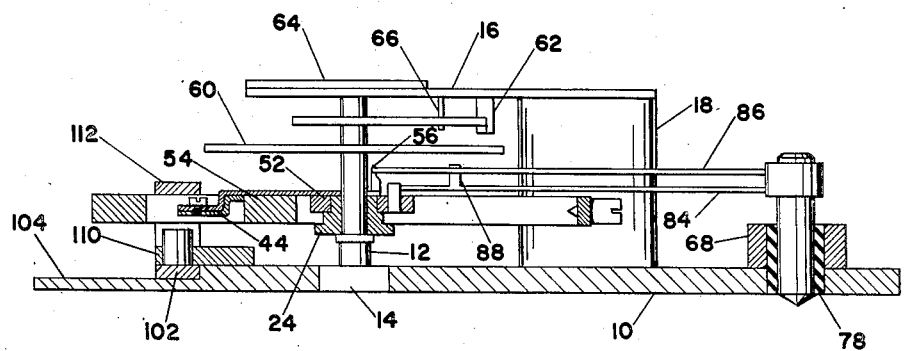
Figure 2 is a vertical section taken along the line 2—2 of Figure 1.
Figure 3:
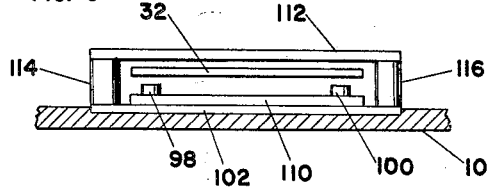
Figure 3 is a partial vertical section taken along the line 3—3 of Figure 1 and showing the shunt arrangement.

Referring to Figures 1, 2 and 3 the isochronal element of the invention comprises a mounting plate 10 which carries a staff 12 in a bearing 14, which may be a jeweled bearing if desired. The upper end of the staff 12 is journaled in a similar bearing in a balance cock 16 mounted on a mounting block 18 by means of a pair of screws which are received in holes 20 in the mounting block 18.

The staff 12 carries a balance wheel shown generally at 22 and which consists of a hub 24, crossarms 26 and rim 28. Suitable poising and balancing screws 30 are mounted in the rim for counterbalancing the coil presently to be described. The rim 28 of the balance wheel is interrupted at the side opposite the screws 30 and a generally pie-shaped coil 32 is mounted between the ends of the rim by means of a pair of small brackets 34 and 36 which are cemented to the coil and attached to the rim by means of screws 38 and 40. One end of the coil 32 is connected to the rim 28, as at 42, while the other end of the coil is wrapped around and soldered to a bracket 44 to which contact strip 46 is attached by means of a screw 48.

The contact strip is secured to the bracket 44 by the screw 48 passing through a slot 50 in the contact strip. This slotted connection allows the contact strip to be positioned radially of the balance wheel to provide for any small differences in the size of the coils or in the distance that the coil is mounted from the balance staff.

A roller table 52 is carried by the hub 24 and serves to support the contact strip 46. A layer of insulation 54 prevents the contact strip 46 from contactinng the roller table 52 and hub 24. The contact strip curves substantially in a semi-circle around the staff and terminates in a vertical finger 56. The roller table also carries on the extended portion thereof a pin 58.

A spiral hairspring 60 is mounted on the staff 12 and has its outer end fastened to a pin 62 on the balance cock 16. A regulator assembly 64 is also mounted on the balance cock 16 and has a pin 66 engaging the hairspring 60 in a conventional manner.

A plate 68 secured to the mounting plate 10 carries a first post 70 and a second post 72. Each of these posts has respectively mounted thereon a collet 74 and 76 and each post is insulated from the plate 68 and mounting plate 10 by an insulating sleeve 78. The collets 74 and 76 are friction held to their respective posts and may be rotated about the posts. Slots 80 and 82 are formed in the respective collets 74 and 76 and are angularly positioned with respect to each other by the aforementioned rotation.

A controlling spring arm 84 is mounted in the slot 80 of collet 74. A second spring arm 86 is mounted in the slot 82 of the collet 76. The second spring arm 86 is mounted at a slightly higher level above the mounting plate 10 than is the controlling spring arm 84 and is prevented from swinging over and beyond the arm 84 by a tab 88 which projects upward from the spring arm 84 into the path of swinging movement of the arm 86. The second spring arm 86 carries at its end a substantially conical shaped contact 90 adapted to engage the vertically positioned end 56 of the contact strip 46.

The first spring arm 84 mounted in the collet 74 serves as a controlling and limiting member, through engagement of the second spring arm 86 with the vertical tab 88 and is hereafter referred to as the controlling spring arm. The second arm 86 carries the contact 90 and is hereinafter referred to as the contact carrying spring arm. The controlling spring arm 84 is longitudinally adjustable in the slot 80, which longitudinal adjustment controls the position at which its end 92 contacts the forward face of the pin 58 as shown in Figure 10, being adjustable between the limits as shown in the solid lines to that shown in the broken lines. This adjustment can be used to partially control the duration of contact.

The controlling spring arm 84 is still further adjusted in its angular relation to the contact carrying spring arm 86 by rotating the collet 74 about the post 70. The latter of these adjustments can be made during the operation of the isochronal device. The contact carrying spring arm 86 is adjustable in a like manner, that is, longitudinally in the slot 82 and angularly by moving the collet 76 about its post 72. This, too, partially controls the duration of contact. Further, the angular adjustment of the collet 76 on the post 72 provides stress in the contact spring arm 86 and determines the force between the contact 90 and the upright end 56 of contact strip 46.

Each of the spring arms is normally positioned angularly so that if unrestrained they would cross one above the other. This crossing, however, is prevented by the engagement of the spring arm 86 with the vertical tab 88 so that both spring arms are maintained in a stressed position, each directing a force against the other.

The spring arms are rectangular in cross section and are comparatively long. The comparative length of the spring arms permits the balance wheel on its oscillation in a clockwise direction in Figure 1, wherein no contact is made, to move the spring arms from the path of the contact with a minimum expenditure of energy. The pin 56 is generally hemispherical in shape with the flat surface 92 disposed to engage the controlling spring arm 84 when the balance wheel rotates in a counterclockwise direction. The hemispherical backside 94 of the pin is cut away at 96 so as to permit a quick disengagement of the pin with the controlling spring arm.

A pair of small cylindrical magnets 98 and 100 are mounted on a shunt member 102 which is received in a cutaway portion 104 of the mounting plate 10. The magnets are disposed beneath the radial arms 106 and 108 of the pie-shaped coil 32. The magnets are secured in position by being friction-fitted into bores in a nonmagnetic member 110 which is fastened to the mounting plate 10. A second shunt member 112 overlies the magnets 98 and 100 and is mounted on a pair of posts 114 and 116 carried by the bottom shunt 102. The two shunts are secured together onto the posts by a pair of screws and the posts and screws may be of a magnetic material. The upper surface of the magnets 98 and 100 are of opposite polarity.

A suitable battery is connected to the mounting plate 10 to which one end of the coil is grounded through the balance wheel, staff, hairspring, balance cock and mounting post 18. The other terminal of the battery is connected to the post 72 which carries the contact spring arm 86. Upon oscillation of the balance wheel current flowing from the battery energizes the coil at the moment that it is in the magnetic field and produces a magnetic thrust against the coil which is transmitted to the balance wheel. This impulse together with the reaction of the hairspring produces oscillating motion of an isochronal nature.

The oscillation of the balance wheel moves the roller table 52 and its pin 58 and contact finger 56. The oscillating movement of the pin and the contact member 56 causes the forward face of the pin to engage the end of the controlling spring arm 84 and move it upwardly. Swinging movement of the controlling arm is followed by a like movement of the contact carrying spring arm 86 in the same direction by reason of the stress within the arm. Further movement of the pin 56 in a counterclockwise direction moves the controlling arm 84 upwardly causing the end to move across the forward face 92 and bring the contact 90 into engagement with the upright finger 56. Immediately upon engagement of the contact point 90 with the face of the finger, the movement of the contact carrying spring arm is restrained and the stress within that arm is partially absorbed at the contact making point.

It is thus seen that the contact 90 is urged against the face of the finger 56 with a predetermined force so that there is no possibility of chatter between the contact point and the finger. This minimizes arching between the contact point and finger and holds the contact against the finger throughout the contact making period with substantially the same force. Further movement of the roller table and its accompanying pin 56 moves the end of the controlling spring arm 84 over the rounded edge 118 of the pin 58 whereupon it drops sharply away from the pin because of the cutaway face 96. This sharp dropping snaps the upright tab 88 of the controlling spring arm against the contact carrying spring arm causing a sharp break in the contact, snapping the spring arms 84 and 86 back to a normal position.

During the contact making operation, that is from the time the contact 90 contacts the face of the finger 56 until it is broken by movement of the controlling spring arm 84, there is a relative motion across the face of the upright finger 56 by the contact 90. This tends to preserve a clean contact-making surface at all times.

During the backward movement of the balance wheel the spring arms are engaged by the pin 58 and swung from the path of its movement. This engagement takes place by the end of the controlling arm 84 engaging the face 96 of the pin 58 and moving both the spring arms downwardly until the end of the controlling spring arm 84 slips past the edge 118 of the pin. The comparative long length of the spring arms makes it possible for the balance wheel to push the spring arms out of position on its backward oscillation with a minimum expenditure of energy and with a minimum of interference with the isochronal movement.

The battery used to energize the coil may be an extremely small battery of the disc type such as is shown in assignee's copending application Serial No. 550,565, filed December 2, 1955. With such a small battery the entire isochronal element may be constructed in extremely miniaturized form and is capable of running for extended periods of time in excess of a year.

Referring to Figure 6 the isochronal element is shown in a transistor circuit which may be constructed in miniature form and which is capable of producing a square wave signal of excellent frequency stability. In this illustration the contact system of the isochronal element is shown as a simple switch 120. The transistor circuit comprises a triggered multivibrator which includes a pair of transistors 126 and 128.

In this circuit a positive trigger voltage is supplied from the resistor 124 through a pair of blocking capacitors 130 and 132 to a pair of unidirectional impedance devices 134 and 136 from which the output is supplied to the base electrodes of the transistors 126 and 128. These transistors are shown in the drawing as having three electrodes, an emitter electrode labeled "E," a collector electrode labeled "C," and a base electrode labeled "B."

A resistor 138 couples the base electrode of transistor 126 to the collector electrode of transistor 128, and a resistor 140 similarly couples the base electrode of transistor 128 to the collector electrode of transistor 126. A pair of resistors 142 and 144 are serially interconnected between the collector electrodes of the transistors 126 and 128. A second pair of resistors 146 and 148 are serially interconnected between the base electrodes of transistors 126 and 128, and a third pair of resistors 150 and 152 are serially interconnected between the emitter electrodes of transistors 126 and 128.

A direct voltage source 154 has its negative terminal directly connected to the junction of resistors 142 and 144 and its positive terminal connected to the junction of resistors 146 and 148. A second direct voltage source 156 has its positive terminal connected to the positive terminal of source 154 and its negative terminal connected to the junction of resistors 150 and 152.

The junction of capacitor 130 and device 134 is coupled through resistor 158 to the negative terminal of a direct voltage source 160, the positive terminal of which is directly connected to the emitter electrode of transistor 128. The junction of capacitor 132 and device 136 is connected through a resistor 162 to the negative terminal of a direct voltage source 164 whose positive terminal is directly coupled to the emitter electrode of transistor 126.

An isochronal positive trigger voltage is created across resistor 124 by the operation of the isochronal device, and the magnitude may be adjusted by positioning tap 125 on resistor 124. The tap is adjusted so that the magnitude of the voltage is greater than the bias on device 136 but less than the bias on device 134. When this voltage is supplied to the junction of capacitors 130 and 132 it is completely blocked by device 134 but is partially passed by device 136 and, consequently, decreases the voltage of the base electrode of transistor 128. The decreased voltage of the base electrode reduces the emitter electrode to base electrode voltage which in turn decreases the current in the collector circuit. The voltage across resistor 144, which is dependent upon the collector current of transistor 128, decreases, increasing the negative voltage on the collector of transistor 128, and this voltage increase is coupled through resistor 138 to the base electrode of transistor 126.

Increasing this base electrode voltage increases the positive voltage between the emitter and base electrodes which effect a collector current increase in transistor 126. An increase in the voltage drop across resistor 142 results from the increased collector current and this increased voltage is coupled through resistor 140 to the base electrode of transistor 128 to further decrease the emitter to base electrode voltage of transistor 128. Hence, transistor 128 is driven to low conduction, and a high current exists in the collector electrode of transistor 126 which causes the collector electrode of transistor 128 to be negative with respect to the collector electrode of transistor 126.

This sequence of operation occurs in a very short time so that when a suitable positive voltage trigger is applied to the circuit, transistor 128 immediately assumes low conduction and transmitter 126, high conduction. Another positive trigger now causes transistor 126 to assume low conduction and transistor 128 to assume high conduction.

Referring to Figure 7 there is shown the square wave voltage output of this circuit which occurs between the collector electrodes when positive trigger voltages are applied at equal intervals of time. The wave form indicated at 166 is the output wave form, while the wave form indicated at 168 is the wave form of the pulses produced across resistor 124 by the isochronal device. The voltage sources which are shown in this circuit may be eliminated or at least substituted for by a resistor shunted by a large by-pass capacitor as will be clear to those skilled in the art.

The foregoing device may be produced in an extremely miniature form and produces a square wave voltage of extremely stable frequency. It is capable of operation over extended periods of time without the attention of an operator and without the replacement of voltage sources. The period of oscillation of the isochronal device may be fixed at any desired value in a range from about 1 to 50 oscillations or cycles per second. In a specific embodiment the period of oscillation is 0.4 second and the contact time is 4 milliseconds.

While the unit shown in Figure 6 produces a square wave output it will be apparent that other wave shapes may be obtained. In particular it is possible to deliver the output of the device shown in Figure 6 to a tuned circuit from which it is possible to obtain not only a sine wave output, but also to obtain odd harmonics of the original signal.

The isochronal device shown in Figures 1 through 3 may also be used as a switch to interrupt the steady flow of plate current through a resonant L–C tank circuit as a means of exciting oscillations in the tank. Such a circuit is known as a shock excited oscillator and finds practical applications in instances where oscillations of a certain frequency occurring over short intervals of time are required periodically. Such an oscillator is indicated in Figure 8, wherein the isochronal device is again indicated as a switch 170 in series with a battery 172. This arrangement is placed in series with an L–C circuit consisting of inductor 174 and capacitor 176. When the switch 170 is opened the resonant tank is shocked into oscillation and these oscillations continue until the switch is again closed unless the switch is left open for such a sufficiently long period of time that the oscillations die out completely.

In addition to use in multivibrator circuits of the triggered type, the isochronal device may also be utilized in free running multivibrator circuits which oscillate at a multiple or submultiple of the frequency of the isochronal device. With reasonable care and circuit adjustment, relaxation oscillators of this type may be controlled when the frequency ratio is as great as 50, but in order to insure reliability of operation, it is best not to exceed a ratio of about 10.

Such a circuit is shown in Figure 9 wherein a pair of triodes 178 and 180 are connected in a conventional multivibrator circuit. In this circuit the controlling signal is supplied by the isochronal device, shown as switch 182, which is connected to a battery 184 and to the grid of tube 178. By means of an arrangement of this type the isochronal device can be utilized to produce a constant frequency signal which is either a multiple or submultiple of its own natural frequency.

While the isochronal device illustrated in Figures 1–3 is shown as being impulsed only once per cycle when moving in one direction, it is also possible to arrange the contacts so that two impulses are provided in each cycle, one in each direction of oscillation. Such a contact arrangement is shown in Figure 4.

According to this embodiment of the invention a staff 186 carries a hub 188 on which a roller table 190 is mounted. Mounted on the extended end 192 of roller table 190 is an insulating pin 194, which may be a sapphire or other jewel for long wear. Attached to either side of the jewel 194 are contact elements 196 and 198 which engage the end 200 of a contact spring arm 202. The arm 202 is mounted in a slot 204 of a collet 206 on post 208 as in the preceding embodiment of the invention.

As the staff and associated roller table 190 rotate in a counterclockwise direction the end of the contact spring arm springs past the jewel 194 without contacting contact 198. As the balance staff rotates in the opposite clockwise direction, the end 200 of contact spring arm 202 engages contact 198 to provide an impulse in the clockwise direction. With an arrangement of this type the isochronal device provides a signal of two pulses per oscillation of the device.

The isochronal device as illustrated in Figures 1–4 utilizes the contact system of the prime mover itself to also provide the output signal. It is also contemplated that this signal may be provided by a separate set of contacts carried by the staff. Referring to Figure 5 there is shown an arrangement of this type.

According to this embodiment of the invention the staff 210 carries a round insulating disc 212 which has mounted thereon a contact bar 214. A contact spring arm 222 resiliently engages the disc 212 and is supported in a slot 224 in a collet 226 mounted on a post 228. It will be obvious that as the staff oscillates two contacts are made per oscillation.

It will be apparent from the foregoing that according to the present invention there is provided a completely portable isochronal device capable of producing a signal of constant and stable frequency. This frequency may either be a multiple or submultiple of the natural frequency of oscillation of the isochronal device and may be provided in a number of different wave shapes and energy levels. The entire unit may be provided in miniature form and is capable of operation over extended periods of time without the attention of an operator. The isochronal control element may be used with other circuits than those specifically described and the invention embraces its use with other types of electrical load devices. In certain arrangements the control element is combined in circuitry to produce a signal which is itself further used, or the circuitry itself may constitute the ultimate use of the signal produced by the control element.

While mechanical switching or contact making devices have been illustrated, it will be understood by those skilled in the art that these may be replaced by electronic switching. As an example, the balance wheel or balance staff may carry one or more small permanent magnets which may be associated with pick-up coils on the frame. These pick-up coils may be connected to control devices such as tubes or transistors which may perform the switching function.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an isochronal apparatus, a frame, a staff rotatably mounted on said frame, a hairspring connected between said staff and frame, electromagnetic prime moving means having a portion thereof mounted on said staff and a portion mounted on said frame, a source of electric power connected to said prime moving means for periodically impulsing said staff and in cooperation with said hairspring sustaining said staff in isochronal oscillation, switching means associated with said staff and frame, and an electrical load receiving an electric signal through said switching means.

2. In an isochronal apparatus, a frame, a staff rotatably mounted on said frame, a hairspring connected between said staff and frame, electromagnetic prime moving means having a portion thereof mounted on said staff and a portion mounted on said frame, a source of electric power connected to said prime moving means for periodically impulsing said staff and in cooperation with said hairspring sustaining said staff in isochronal oscillation, switching means having a portion thereof rigidly affixed to said staff and a portion mounted on said frame, and an electrical load receiving an electric signal through said switching means.

3. A device as set out in claim 2 wherein said prime mover includes permanent magnetic means and coil means, one of said means being mounted on said staff and the other of said means being mounted on said frame.

4. A device as set out in claim 3 wherein said coil means is periodically connected to a source of electric power by switching means actuated by movement of said staff.

5. A device as set out in claim 4 wherein said switching means for connecting said load to a source of power and said switching means for connecting said coil to a source of power are the same switching means.

6. A device as set out in claim 4 wherein said coil means is mounted on said staff and said permanent magnetic means is mounted on said frame.

7. A device as set out in claim 6 wherein said permanent magnetic means produces a pair of magnetic fields having magnetic axes parallel to said staff and spaced apart about said staff less than 180°.

8. A device as set out in claim 7 wherein said coil lies substantially in a plane perpendicular to said staff.

9. A device as set out in claim 6 wherein said first named switching means comprises a contact arm mounted on said frame extending toward said staff, and including contact means mounted on said staff for periodic engagement with said contact arm.

10. A device as set out in claim 9 wherein said contact arm and contact means comprises both said first and second mentioned switching means.

11. In an isochronal apparatus, a frame, a staff rotatably mounted on said frame, a hairspring connected between said staff and frame, electromagnetic prime moving means having a portion thereof mounted on said staff and a portion mounted on said frame, a source of electric power connected to said prime moving means for periodically impulsing said staff and in cooperation with said hairspring sustaining said staff in isochronal oscillation, switching means having a portion thereof rigidly affixed to said staff and a portion mounted on said frame, and means for generating an electric signal connected to and having its frequency controlled by said switching means.

12. A device as set out in claim 11 wherein said signal generating means includes three terminal electronic switching devices.

13. A device as set out in claim 12 wherein said three terminal devices are connected in a multivibrator circuit.

14. A device as set out in claim 12 wherein said three terminal devices are connected in an oscillator circuit.

15. A device as set out in claim 13 wherein said multivibrator is a triggered multivibrator.

16. A device as set out in claim 13 wherein said multivibrator is a free running multivibrator.

17. In an isochronal apparatus an electric load actuated by periodic pulses of electric current, a frame, a staff mounted for oscillation in said frame, resilient spring means connecting said staff to said frame, an electromagnetic prime mover having one portion thereof mounted on said frame and another portion on said staff, switch means having a portion thereof mounted on said staff and a portion on said frame, a source of electro-chemical power, at least a portion of said switch means connected to said electro-chemical power and to said prime mover for periodically energizing said prime mover to produce, in conjunction with said spring means, an isochronal oscillating movement of said staff, said switch means being connected to said load means to supply said pulses thereto.

18. A device as set out in claim 17 wherein that portion of said switch means which connects said electro-chemical power to said prime mover also supplies said pulses to said load means.

19. A device as set out in claim 18 wherein said switch means includes a first contact member carried by said staff and a second contact member carried by said frame.

20. A device as set out in claim 19 wherein said load means comprises a circuit for producing an alternating current output signal of greater magnitude than the current flowing to said prime mover, the frequency of said output signal being controlled by the frequency of switching of said switch means.

No references cited.